Sept. 11, 1962      C. A. HEUER      3,052,964

METAL FABRICATION

Filed Sept. 29, 1958

INVENTOR.
CHARLES A. HEUER

BY

ATTORNEYS

United States Patent Office 3,052,964
Patented Sept. 11, 1962

1

3,052,964
METAL FABRICATION
Charles A. Heuer, East Alton, Ill., assignor to Olin Mathieson Chemical Corporation, East Alton, Ill., a corporation of Virginia
Filed Sept. 29, 1958, Ser. No. 763,917
4 Claims. (Cl. 29—157.3)

This invention relates to the making of composite structures and more particularly to a method of preventing the formation of oxides between the surfaces of metal sheets that are to be joined together in the fabrication of composite metal strucures.

In the well known and practical process of fabricating hollow panels such as refrigerator heat exchangers and the like, as fully disclosed in a patent to Grenell, U.S. 2,690,002, granted on September 28, 1954, a pattern of weld-inhibiting material is applied to a clean surface of a sheet of metal. A clean surface of a second sheet of metal is superimposed on this surface and the two sheets are secured to prevent relative movement and are welded together by hot rolling in the adjacent areas thereof which are not separated by the weld-inhibiting material. Hot rolling of the sheets results in reducing the thickness of the two sheets and elongating the resultant blank in the direction of rolling while the width of the resultant blank remains substantially the same as the initial width of the sheets. Following the hot rolling operation, the resultant blank is usually softened as by annealing to make it more pliable and if desired it may then be cold rolled and again softened as by annealing. The weld-inhibiting material results in an unjoined portion between the outer surfaces of the blank. After softening the blank, the unjoined portion is expanded by injecting therein a fluid pressure of sufficient magnitude to permanently distend the blank in the area of the unjoined portion.

In the above described process it is necessary that the surfaces of each sheet be cleaned in order that the welding be successful. However, with certain metals such as copper, alloys thereof, such as various brasses, and like metals, problems arise in maintaining the welding surfaces clean in accordance with the requirements of the aforesaid patent. For example, upon heating of copper to suitable welding temperatures, in the absence of any sealing means, air readily enters between adjacent surfaces, of the superimposed sheets, to oxidize the surfaces causing interference with the welding operation. Although the use of a non-oxidizing atmosphere during the heating operation prevents oxidation of the metal during heating to welding temperatures, however, the welding surfaces become oxidized during the period of time when the superimposed sheets are transported from the protective atmosphere to the welding means at the welding temperature.

Various methods have been suggested to overcome the problem of maintaining the welding surfaces of superimposed sheets clean by preventing oxidation during the transport of the superimposed sheets from the protective atmosphere to the welding means. It has been proposed to prevent the oxidation of welding surfaces during transport of the sheets by welding the edges of adjacent sheets, by methods such as the heliarc process, which is not only an expensive process, particularly with a low reduction rate, but is, in addition, time consuming. Further, occasional breaks in the weld-seal permit inflow of air, during the transporting of the superimposed sheets, and result in the oxidation of the welding surfaces of the sheets.

An alternative method suggested to overcome the aforesaid oxidation was by protection of the panel, during its transportation between the mouth of the heating furnace and the point of welding, in a tunnel in which a suitable protective atmosphere is maintained. However, the use of an atmosphere tunnel between the point of heating and the welding means presents very complex mechanical problems and necessitates machinery which is inherently costly to maintain.

Accordingly, an object of this invention is to provide an improved method of overcoming disadvantages of the prior art.

Another object of this invention is to provide an improved method for the fabrication of composite structures which avoids the formation of oxides on the welding surfaces of component sheets thereby maintaining the aforesaid surfaces clean for subsequent welding operations.

Still another object of this invention is to provide an improved method for sealing the welding surfaces of readily oxidizable metals, of component sheets employed in the fabrication of composite structures, against oxidation at high temperatures by deleterious atmospheres, and which maintain the aforesaid surfaces clean for subsequent welding operations.

A further object of this invention is to provide an improved method for welding the welding surfaces of readily oxidizable component sheets, employed in the fabrication of composite structures, whereby oxidation of the aforesaid surfaces is effectively prevented in oxidizing atmospheres, and wherein said surfaces are maintained clean for a better and more intimate contact between the metals and subsequent welding operations.

It has been discovered that by coating the surface of readily oxidizable metals with a ribbon of material, which is reactive to the oxygen of the air, at a point at or adjacent the edges of the sheet in surrounding relationship to the welding surfaces, effective protection is obtained against oxidation at high temperatures in corrosive atmospheres. The application of the oxygen reactive material in this manner will allow the exposure of superimposed sheets to air for brief intervals, during their transport, between the means of heating to the welding temperatures and the welding means, without permitting the entry of sufficient oxygen, between the sheets, to cause the formation of oxidation to an extent which would prevent welding, or decrease the quality or strength of the welds at the interface of the superimposed sheets.

Other objects and advantages will become more apparent in the following description and drawings in which.

Figure 1:
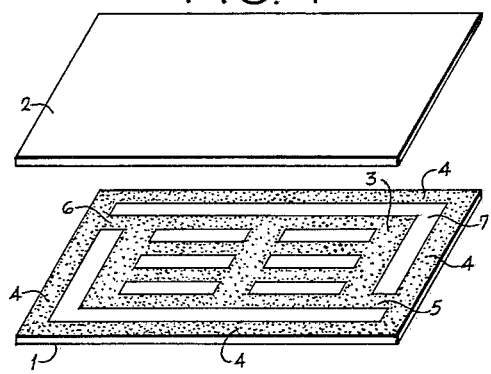
FIGURE 1 is a perspective view of an embodiment of this invention showing a pair of sheets to be joined in the manner of the aforesaid patent provided with the protective seal of this invention.

Referring to the drawings, FIGURE 1 shows two sheets 1 and 2 of readily oxidizable metal such as a tough pitch copper consisting of 99.9% minimum copper, 0.003% maximum phosphorous, 0.05% maximum oxygen and 0.01% maximum of other impurities for a maximum total of 0.03% in sheets of 0.125 inch in thickness, which upon superimposition of the two sheets of metal forms a pack 0.250 inch thick. Other readily oxidizable metals may be employed are pure copper, copper alloys, as brass, and the like. The welding surfaces of sheets 1 and 2 were degreased and cleaned in accordance with the teachings of the aforesaid patent. A weld preventing material such as a suspension of colloidal graphite in water is applied in a thin layer to selected areas on a clean surface of sheet 1 according to a predetermined pattern 3. The consistency of the suspension is such as to permit its application by spraying through a mask die, painting through a stencil, squeezing through a silk screen or in any suitable manner, such as printing.

Use of the colloidal suspension of graphite in water is specifically advantageous since it not only functions as a weld-inhibiter, but also as an oxygen reactive material to effect an operative seal against the entry of air within the portion of the superimposed sheets desired to be united in a subsequent welding operation.

The colloidal suspension of graphite is then applied at and about the edges of sheet 1 at 4 to completely encircle the applied pattern of separation material 3 to which it is connected by strips 5 and 6.

The composition of the weld-inhibiting material selected for defining the pattern of passageways is not required by the invention to be the same as that of sealing strip 4. For example, if the weld-inhibiting material is inert to oxygen at high temperatures, it may still be employed, however, in such an event, strip 4 must then be selected from those materials which form an effective seal in accordance with the requirement of this invention. More specifically, if a suspension of $TiO_2$ in water is employed, strip 4 will necessarily be different in composition from that of the weld-inhibiting material, and may be selected from materials enumerated below.

Portion 7 of the panel contained within the encircling strip 4 is that portion of sheet 1 which defines the welding area to be welded to a similar portion of sheet 2 to form the finished article containing the desired pattern of unjoined portions. After welding, the portions of the composite panel which contain the sealing strip 4 may then be trimmed from the panel in any conventional manner, such as shearing.

For purposes of this application and claims, portion 7, which is the portion of sheet 1, after trimming of the edges containing strip 4, desired in the final fabricated unit inclusive of the pattern of areas to remain unjoined, is hereby defined as the faying surface of the component sheet 1. The definition of the faying surface applies, in like manner, to that portion of sheet 2 which is to be welded to portion 7 of sheet 1.

Preferably a similar strip of reactive material 4, not shown, is applied about and adjacent the edges of the lower surface of sheet 2 which mates with the strip of reactive material on sheet 1 when the two sheets are superimposed, since it has been found that optimum effective protection is obtained in this manner. As is apparent, the amount of the oxygen reacting material to be added is dependent upon the interval of time which the superimposed sheets are subject to any oxidizing atmospheres. Thus, if the interval of time is quite short, a small quantity of oxygen reactive material need be applied. However, if the interval is long, such as a waiting period between the heating, to welding temperatures, operations and welding in accordance with the aforesaid patent, greater quantities must be employed. Such quantities can be readily determined by one skilled in the art for each specific interval of time necessary between heating and welding, for the superimposed sheets to be kept in corrosive atmospheres.

Although a suspension of colloidal graphite in water has been employed above, it is apparent that other suitable weld-inhibiting materials may be employed to prevent bonding of the adjacent areas within the faying surfaces of the superimposed sheets, for example, the above suspension of $TiO_2$ in water.

The sealing strip 4 is not restricted to the specific example of a colloidal suspension of graphite in water employed about the faying surfaces of sheet 1 since it has been described as illustrative of other materials functioning in like manner. Examples thereof are sodium fluoborate, graphite, lampblack, and the like. Another specific composition effective, as an oxygen reactive material, consists of 85% to 92% copper, 8% to 15% phosphorous added to a 2% to 5% gel of magnesium montmorillonite. The specific proportion found particularly effective consisted of 91.5% copper, 8.5% phosphorous in a 3% gel of magnesium montmorillonite.

The magnesium montmorillonite employed above, also known by the trade name of Ben-A-Gel, is a hydrous magnesium silicate and is available from the National Lead Company as a granular powder, milk white in color, with a specific gravity of 2.4, and readily forms a gel in tap water. Although there is considerable disagreement and confusion as to the chemical structure and symbol, it is probably a mixture of the hydro gels of silica and alumina with the best formula of $AL_2O_3 \cdot 4SiO_2 \cdot 9H_2O$ or $$8_2Ae_2Si_2O_{12} \cdot nH_2$$

The chemical stability or the physical changes involved in the specific oxygen reactive material selected for the sealing strip 4 is immaterial provided it does not interfere with the welding of the faying surfaces of the component sheets. Thus, the reactive material may melt, sublime or decompose at the welding temperatures employed prior to its sealing function. However, as noted above, it is essential that no residue, remaining after decomposition or chemical combination, which prevents or inhibits welding enter between the faying surfaces of the component sheets. The reactive materials enumerated above fulfill such requirements. It is to be understood, however, that although specific materials have been enumerated, other oxygen reactive materials will readily become apparent to one skilled in the art.

Although strips 5 and 6 have been provided on the faying surface of sheet 1 connecting the pattern of weld-inhibiting material 3 with the encircling strip 4 of oxygen reacting material, it will be understood that these strips may be omitted, and the final welded and trimmed hollow article can then be expanded by counterboring through one side of the welded composite panel to the weld-inhibiting material, attaching a suitable connection and thereafter expanding by the application of suitable fluid pressures. If desired, sheets 1 and 2, after superimposition, may be tack welded at the corners to prevent relative movement between each other.

After panels 1 and 2 have been superimposed on each other, they are then heated in a protective atmosphere, inert or reducing, to the welding temperature of 1650° F. After heating, the superimposed sheets are then removed from the atmosphere, transported, or transferred to the welding means, and thereafter welded by conventional welding means.

During the interval of time at which the heated superimposed sheets are maintained out of the protective atmosphere, and prior to welding, the faying surfaces of the component sheets 1 and 2 are protected from harmful oxidation by the sealing strip 4. The sealing action is accomplished by the chemical combination of the oxygen reacting material with oxygen to prevent its entry past the point of application of strip 4. As a result the cleaned and degreased portion of the component sheets comprising the faying surfaces are effectively maintained free from oxidation interfering with the welding operation.

One well known method of welding sheets 1 and 2 together is by passing them through a pair of mill rolls 8 with a 65% reduction to effect the welding of the faying surfaces and obtain the welded panel 9. In rolling, the sheets are reduced in thickness and elongated in a direction of rolling. As will be observed, even though the faying surfaces are welded together, the line of separation 10 at the edges of the superimposed sheets is not erased after the welding operation. The line of separation results in failure of the panel to weld to the depth of the application of the strip of oxygen reacting material 4.

Figure 3:
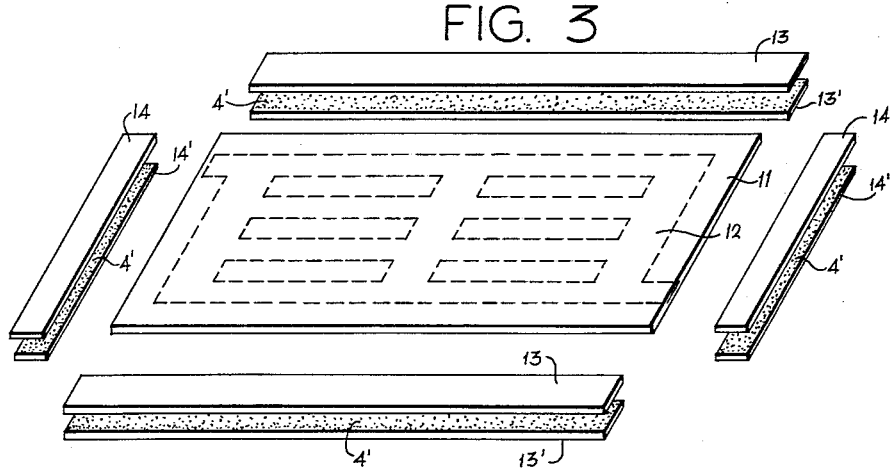
FIGURE 3 is a perspective view of the resultant sheet obtained in FIGURE 2 with the portions of the edges containing the oxygen reacting material of this invention trimmed from the desired welded portion of the panel.

If desired, blank 9 having an unjoined interior portion within the welding faying surfaces, and still containing the unwelded edges defined by strip 4, may be softened in any appropriate manner as by annealing, and thereafter cold rolled to provide a more even thickness and again annealed. However, the welded blank 9 may be trimmed at any point subsequent to the welding operation. The trimming comprises shearing blank 9 to the ultimate dimension desired, by cutting away the edges of the blank between which the oxygen reacting material 4 has been interposed, to leave the final finished blank 11 containing an unjoined inner-portion 12 resulting from a weld-inhibiting material 3. In FIGURE 3 the trim strips are shown as separated in an exploded form to illustrate the failure of their adjacent surfaces to weld due to the application between them of the specific strip of oxygen reacting material 4. Accordingly, trim strip 13 is shown separated from 13' and trim strip 14 is shown separated from trim strip 14' with the residue 4' of the oxygen reacting material remaining after the welding operation. It is to be understood that it is not necessary to trim the article if the unwelded edges can be employed for any functional purpose. For example, the edges may be turned perpendicular to the plate to form appropriate flanges which may be employed in any suitable manner as hangers or suspenders for securing the final fabricated unit into a specific location requiring such attachment.

As noted above, although the above has shown the use of the oxygen reacting material acting as a weld-inhibiting material, it is to be understood that oxygen reacting material which promote welding may also be used. The sole requirement is that the oxygen reacting material provide an effective barrier against oxygen to effectively prevent its entry between the faying surfaces of the component sheets to be welded together.

Figure 2:
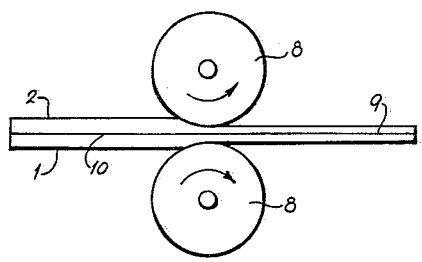
FIGURE 2 is an elevational view illustrating the welding of the superimposed sheets of FIGURE 1 between mill rolls.
Figure 4:
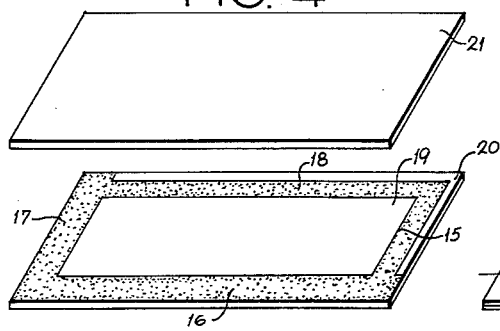
FIGURE 4 is a perspective view of another embodiment of this invention illustrating a pair of sheets to be welded together provided with the oxygen reacting material of this invention.
Figure 5:
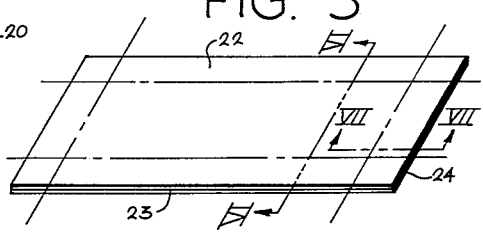
FIGURE 5 is a perspective view of a composite panel welded from the component sheets of FIGURE 4.
Figure 6:
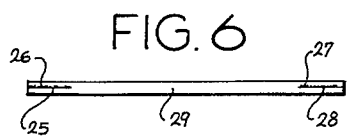
FIGURE 6 is a cross-sectional view taken along the lines VI—VI of FIGURE 5.
Figure 7:
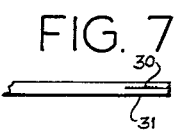
FIGURE 7 is a partial cross-sectional view taken along the lines VII—VII.

Although the invention has been described above with respect to the fabrication of hollow articles in accordance with the method described in the aforesaid patent, FIGURE 4 illustrates the application of the instant invention to the welding of component sheets into a unitary solid structure. Further the embodiment disclosed in FIGURE 4, when applied to the specific copper composition, weld-inhibiting and oxygen reacting material employed in the embodiment of FIGURE 1 further illustrates, with respect to the specific components, that regardless of whether the oxygen reacting material is placed adjacent the edge of the component sheets, or at a point, within the sheet, removed from the edge between the superimposed sheets, welding does not occur between the component sheets from the point of application of the oxygen reacting material to the edges due to the entry of oxygen therein to oxidize the surfaces thereof. In FIGURE 4 ribbon strips 15, 16, 17 and 18 of oxygen reacting material are applied about the faying surface 19 of sheet 20. Strips 16 and 17 are applied on the sheet adjacent the respective edges whereas strips 15 and 18 are applied at a point inward from their respective edges. A sheet 21 is then superimposed upon sheet 20, and the superimposed sheets are then heated, by any conventional method, to the welding temperatures in a protective atmosphere, removed from the protective atmosphere, transferred to any conventional forging means, such as the mill roll 8 in FIGURE 2, and welded thereat into the composite sheet 22. As can be noted in FIGURE 5, if the specific components employed in FIGURE 1 are used, a line of separation 23 and 24 about the edges remains in panel 22 due to the failure of the edges to weld. As can be seen, even though strip 15 of oxygen reacting material is applied inwardly of its respective edge, the portion between strip 15 and its respective edge fails to weld due to the entry of oxygen therein to oxidize the adjacent surfaces. This is illustrated in FIGURES 6 and 7 showing the line of separation 25 in which is contained a residue 26 of the strip of oxygen reacting material 16 remaining after the welding operation. On the opposite side thereof, 27 indicates the oxygen reacting material, and/or residue thereof remaining after the welding operation at its point of application with the line of separation 28 continuing from that point of application to the respective edge. Portion 29 between the point of application of strip 16 and 18 indicates the portions of the component sheets successfully welded. FIGURE 7 shows the residue 30 of the strip 15 of the oxygen reacting material remaining after welding with the line of separation 31 continuing to the respective edges.

Although the invention has been described with reference to specific embodiments, materials and details, various modifications and changes will be apparent to one skilled in the art and are contemplated to be embraced within the invention.

What is claimed is:

1. A method for joining components of a composite structure at high temperatures comprising forming a pack of at least two metallic component sheets, sealing said pack from oxidizing atmospheres by interposing between adjacent sheets a continuous band of an oxygen reactive material in a pattern completely encircling the faying surfaces of said sheets, said material comprising graphite and forming the sole barrier between said surfaces and the atmosphere externally of said sheets, said barrier being permeable to said atmosphere with said material having sufficient reactivity with oxygen to provide an effective barrier against entry thereof to said faying surfaces, heating said pack in a protective atmosphere to the working temperature of said pack, removing said pack from said atmosphere, transporting said pack to a pressure welding means, and subjecting said pack to pressures to weld said faying surfaces at said working temperature.

2. The method of claim 1 wherein said reactive material comprises a suspension of colloidal graphite in water.

3. A method of forming passages in a multi-layer sheet metal structure having interposed between and within adjacent faying surfaces of superposed metal sheets a pattern of stop-weld material defining a potential pattern of interconnecting passageways, comprising sealing said pack from oxidizing atmospheres by interposing between adjacent sheets a continuous band of an oxygen reactive material as a second pattern completely encircling the faying surfaces of said sheets, said oxygen reactive material comprising a suspension of colloidal graphite in water and forming the sole barrier between said surfaces and the atmosphere externally of said sheets, said barrier being permeable to said atmosphere with said oxygen reactive material having sufficient reactivity with oxygen to provide an effective barrier against entry thereof to said faying surfaces, heating said structure in a protective atmosphere to the welding temperature, removing said structure from said atmosphere, transporting said structure to a roll-forging means, and roll-forging said sheets at said welding temperature.

4. A method of making hollow sheet metal structures comprising superimposing sheets selected from the group consisting of copper and copper base alloys with a stop-weld material interposed between and within adjacent faying surfaces of said sheets in a predetermined first pattern of interconnected passageways, sealing said superimposed sheets from oxidizing atmospheres by interposing between adjacent sheets a continuous band of oxygen reactive material as a second pattern encircling the faying surfaces of said sheets, said oxygen reactive material comprising a suspension of colloidal graphite in water and forming the sole barrier between said surfaces and the atmosphere externally of said sheets, said barrier being permeable to said atmosphere with said oxygen reactive material having sufficient reactivity with oxygen to provide an effective barrier against entry thereof to said faying surfaces, heating said superimposed sheets to their welding temperature, and forge-welding said sheets at said welding temperature.

References Cited in the file of this patent

UNITED STATES PATENTS

| | | |
|---|---|---|
| 2,558,093 | Kinney | June 26, 1951 |
| 2,690,002 | Grenell | Sept. 28, 1954 |
| 2,718,690 | Ulam | Sept. 27, 1955 |
| 2,740,188 | Simmons | Apr. 3, 1956 |
| 2,896,312 | Schell | July 28, 1959 |

FOREIGN PATENTS

| | | |
|---|---|---|
| D. 16,645 | Germany | Aug. 30, 1956 |